United States Patent Office 2,999,573
Patented Sept. 12, 1961

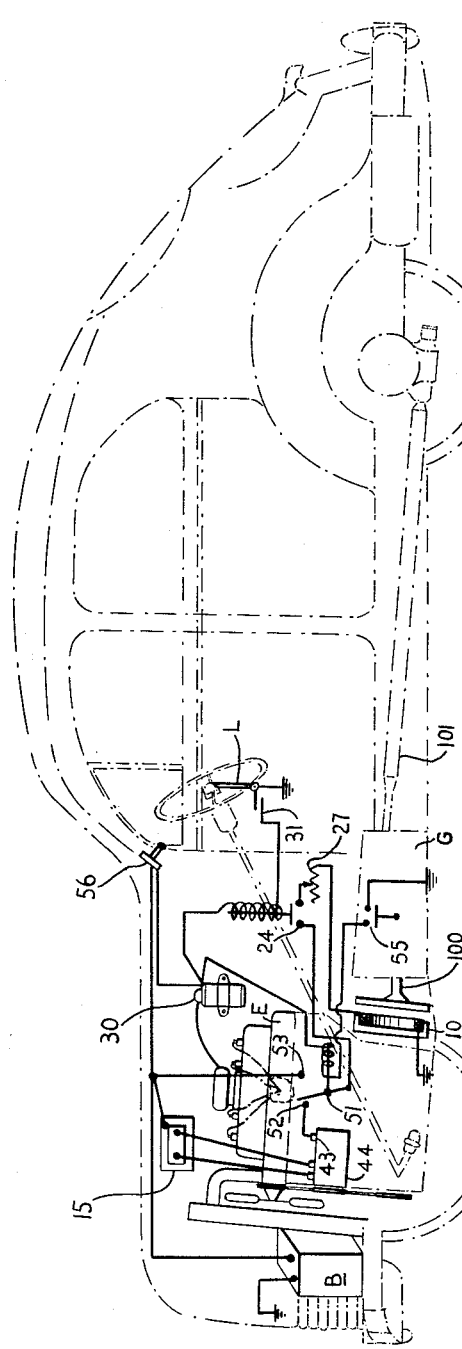
FIG. IA

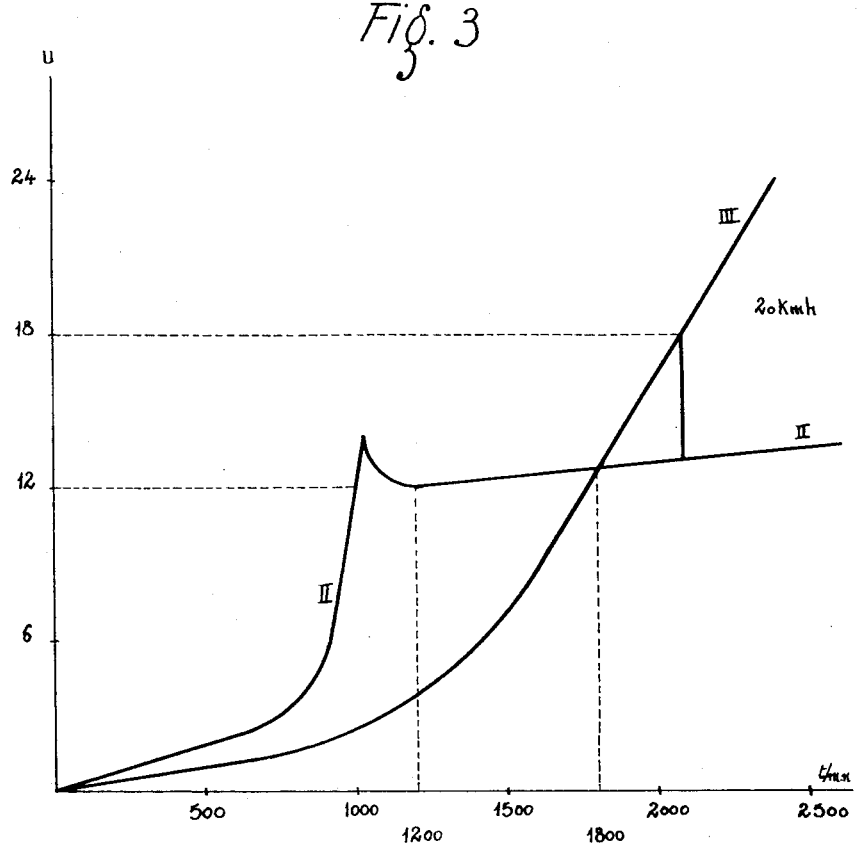

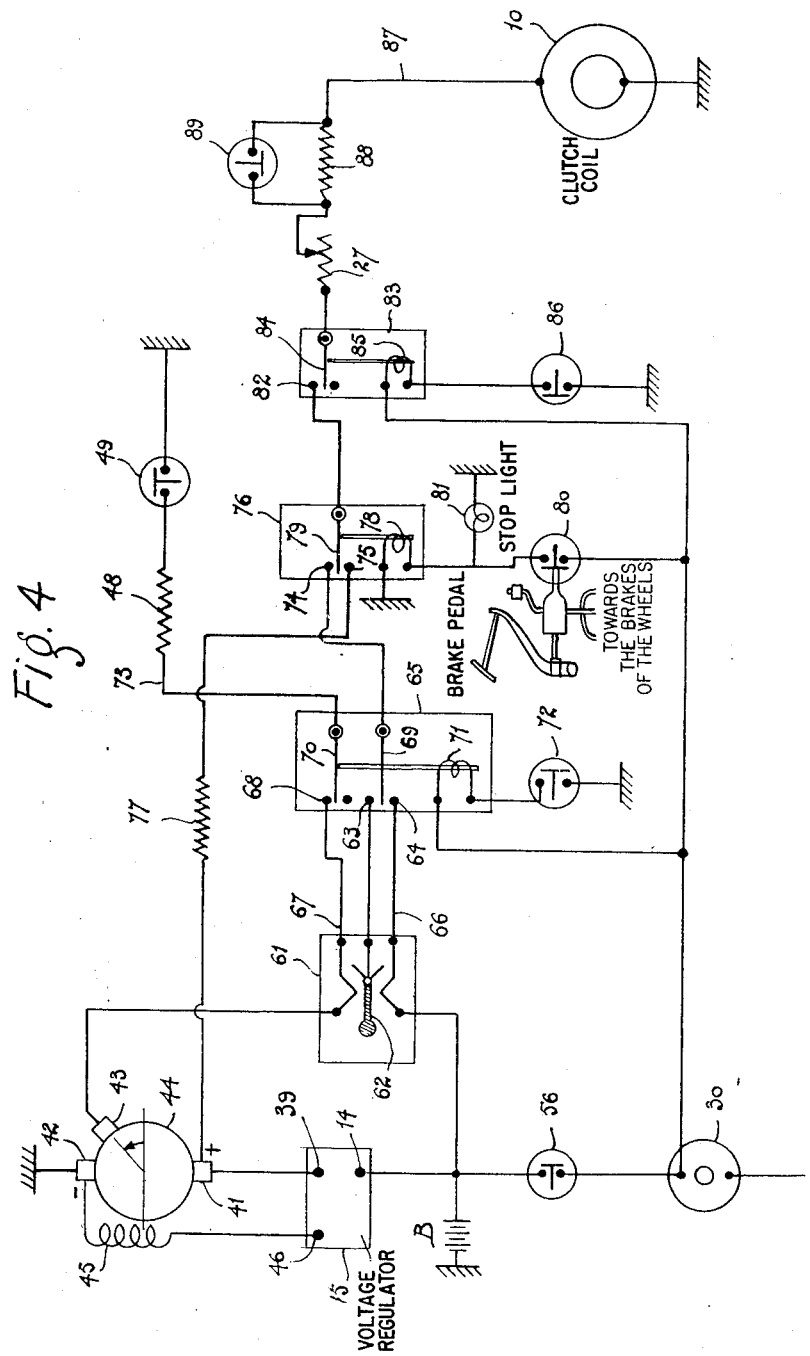

2,999,573
ELECTRIC CONTROL CIRCUIT FOR ELECTRO-MAGNET CLUTCHES
Jean Maurice and Michel Rist, Paris, France, assignors to Societe Anonyme Francaise du Ferodo, Paris, France, a corporation of France
Filed Dec. 17, 1957, Ser. No. 703,422
Claims priority, application France Dec. 19, 1956
11 Claims. (Cl. 192—3.5)

The present invention relates to a control circuit for an electro-magnetic clutch, especially for automobile vehicles, comprising a first connection corresponding to the starting phase and at least a second connection corresponding to the phases following, and more particularly to a circuit of this kind in which the first connection includes the supply of the clutch by means of a third brush of a dynamo with three brushes, the two main brushes of which are connected respectively to the circuit of the vehicle and to earth.

In the known circuit of this type, the supply of the clutch from the third brush is generally limited to a part of the slip of the clutch and is directly followed by a supply from the battery of the vehicle, the change-over from one supply to the other being arranged substantially at the moment of the conjunction, or for a given speed of the vehicle. These known arrangements are however liable to result in errors of operation and shocks, especially with electro-magnetic clutches of the type with friction plates.

The present invention has for its object a control circuit for an electro-magnetic clutch which is free from these drawbacks, and which is characterised in that, the first connection comprising a supply of the clutch from a third brush of a generator with three brushes, the two main brushes of which are respectively connected to the circuit of the vehicle and to earth, the change-over from the first connection to the second connection is retarded until the clutch can transmit its full torque, means being provided in order that the voltage of the control circuit does not rise to a dangerous value as regards the working of the said circuit and of its contacts.

In accordance with a further feature of the invention, the third brush located between the main brush and the earth brush considered in the direction of rotation of the armature, has an angular position which is comprised between $+15°$ and $-45°$, and preferably between $0°$ and $-35°$; the polar axis being taken as the direction of origin, the angles being counted positively towards the main brush and negatively towards the earth brush.

In accordance with the invention, the change-over from the first connection to the second connection is provided either for a voltage at the terminals of the clutch developing between 1.1 and 2 times and preferably 1.5 times the maximum engine torque, namely for a voltage comprised between 1.1 and 2 times and preferably equal to 1.5 times the battery voltage, or for an engine speed comprised between 1400 r.p.m. and 2,500 r.p.m., and preferably in the vicinity of 2,000 r.p.m., or for a motor speed comprised between 1.5 and 3 times the conjunction speed, or for a pre-determined speed of one of the shafts of the gear-box. Such a change-over may be effected on the battery, or preferably first of all on the main brush of the generator, so as to return to a regulated voltage when the voltage at the third brush becomes dangerously high, and then on the battery as a function of the speed of the vehicle in order to maintain the braking effect of the engine.

In accordance with the invention, other auxiliary means of regulation may also be provided and may comprise variable resistances and/or a stabilising resistance in shunt with the operating coil of the clutch.

Other objects, features and advantages of the invention will become apparent from the description which follows below of certain forms of embodiment chosen by way of example, reference being made to the accompanying drawings, in which:

FIG. 1a is a diagrammatical view of an automotive vehicle equipped with a clutch controlled in accordance with the invention;

FIG. 3 is a curve illustrating the variations of the supply voltages between the main brush and earth on the one hand and between the third brush and earth on the other hand, as a function of the engine speed;

FIG. 4 is a diagram of a further alternative form of circuit.

Figure 1:
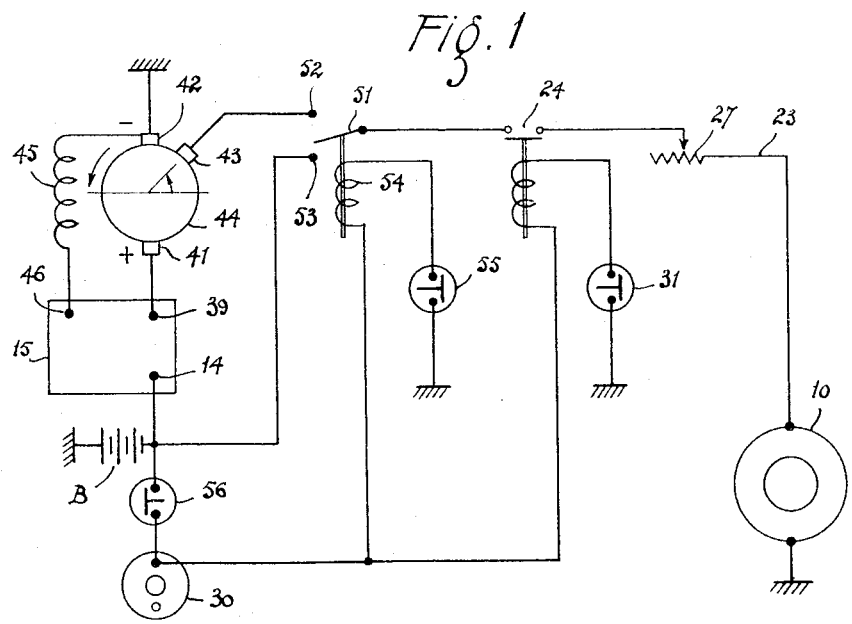
FIG. 1 is a diagram of an electric control circuit for the electro-magnetic clutch of an automobile vehicle, in accordance with the invention.

Reference will first of all be made to FIGS. 1 and 1a, in which the progression of the clutch engagement is obtained by supplying the clutch coil 10 from a brush 43 of the dynamo 44 of the vehicle, which is arranged between the main positive brush 41 and the negative earth brush 42, taken in order following the direction of rotation of the armature. There can be seen at 45 the field of the dynamo 44, the voltage regulator at 15, and at B the battery of the vehicle. In accordance with the invention, taking the polar axis as the direction of origin and counting the angles positively towards the brush 41 and negatively towards the brush 42, the angular position of the brush 43 is chosen so as to be between $0°$ and $-35°$, whilst a wear resistance 27 is chosen to be substantially nil when the clutch is new. When the setting of the resistance 27 is modified following the wear taking place in the linings of the clutch, it is not necessary to modify this angular position of the third brush 43.

By virtue of the chosen position of the brush 43, there is obtained, as indicated in FIG. 3, a curve of voltage as a function of the engine speed shown by the curve III, whilst the curve of the voltage at the brush 41 is given by the curve II.

The rise of curve III, in spite of the stability of the voltage at the brush 41, is due to the reaction field of the armature, which is additive to that of the inductor field.

The dynamo 44 delivers through its main brush 41 into the regulated circuit at 15, of which the battery B is normally charged, and the curve III is more gradual than the curve II but is nevertheless increasing fairly rapidly in order that the clutch may reach its maximum nominal torque (in the vicinity of 1.5 times that of the driving torque) for a rotational speed of the engine E comprised between 1200 and 1800 r.p.m. This is favourable to the operation of the electro-magnetic clutch by virtue of this limitation of the slip period at high torque values.

If the supply of the clutch were always effected by this third brush or if the change-over to another source of current supply were controlled by the driven shaft for a vehicle speed in excess of a pre-determined value, an over-voltage might be generated which would damage the clutch if the engine were run-up to high speed with the vehicle stationary. In order to avoid this drawback, in accordance with the invention, the supply from the third brush is interrupted in any suitable manner and the supply voltage (see FIG. 3) which first of all increases following the curve III, is abruptly brought back to the regulated voltage represented by curve II which, after the conjunction, represents the common voltage at the brush 41 and at the positive terminal of the battery.

There is shown in FIG. 1 a relay 24 which is actuated by a switch 31 sensitive to a condition of grip of the gear-changing lever L. Such lever and switch are for example of the type disclosed in our United States Patent 2,846,036.

The relay 24 is arranged with the wear resistance 27 in the clutch circuit 23. The conductor 23 is connected to the finger 51 of a reversing relay, of which one terminal 52 is connected to the third brush 43 and the other terminal 53 to the battery B of the vehicle. The solenoid circuit 54 of this relay is supplied from the battery B through the intermediary of the ignition coil 30, and comprises a switch 55.

The switch 55 opens and closes as a function of any appropriate factor, for example the speed of the input shaft 100 of the transmission G or of an intermediate shaft of the transmission, or again the outlet shaft 101 of the transmission G, so as to substitute the battery supply for that of the brush 43 when the voltage (or the current) developed by this latter reaches a value at most equal to about 130% or 150% of the voltage (or the current) of the battery.

In an alternative form (see FIG. 2), the arrangement is similar to that which has just been described with reference to FIG. 1, but the terminal 52, instead of being directly connected to the brush 43, is coupled to the finger 57 of a voltage reversing relay, of which one terminal 58 is connected to the brush 43 and the other terminal 59 to the brush 41. The solenoid circuit 60 of this relay is supplied by the brush 43 so as to place the finger 57 on the terminal 58 when the voltage at 43 is less than a pre-determined value, and to place the fingers 57 on the terminal 59 when the voltage at 43 is greater than that value. The switch 55 is preferably connected with the speed of the intake shaft of the gear-box so as to retain the engine brake at low speeds. By virtue of the reversing relay 57, the clutch is not subjected to an excessive voltage, since above a pre-determined voltage at 43, the supply is effected by the regulated voltage of the brush 41.

Figure 2:
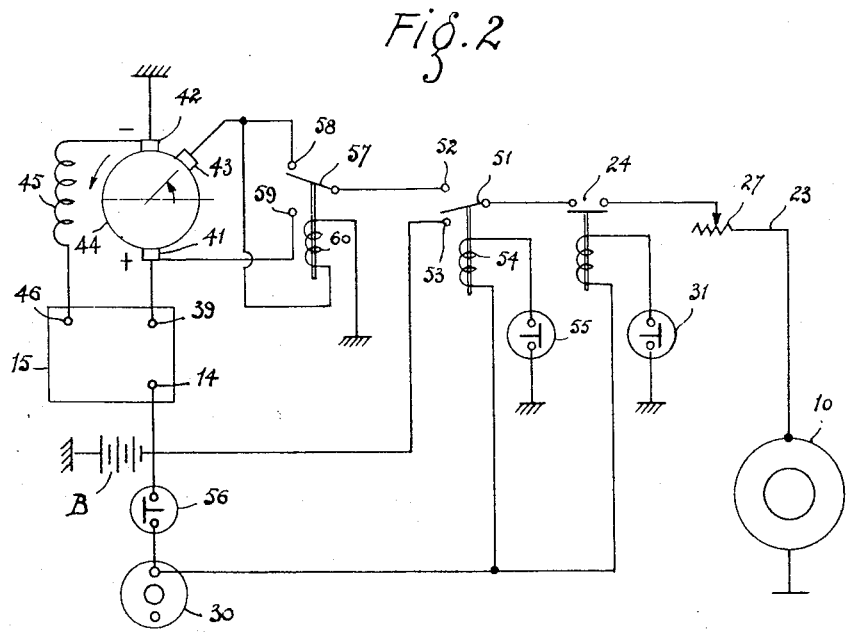
FIG. 2 is a diagram of an alternative form of circuit.

In accordance with the invention, and as shown in FIGS. 1 to 3, the voltage of the third brush 43 reaches the voltage of the battery B or a voltage such that the clutch develops a torque equal to 150% of the maximum engine torque at full throttle opening for an engine speed comprised between 1600 r.p.m. and 2,400 r.p.m., this voltage being reached for an engine speed comprised between 2.5 times and 5 times the idling speed and/or between 1.5 and 3 times the conjunction speed; the clutch 10 is no longer supplied by the third brush 43 at an engine speed in the vicinity of 2,000 r.p.m. or comprised between 1.5 and 3 times the conjunction speed, or for a speed of the intake shaft of the gear-box in the vicinity of 2,000 r.p.m., or for a vehicle speed such that in the highest ratio of the gear-box the speed of the intake shaft of the gear-box is greater than the idling speed; variable resistances may be introduced into the circuit and are made controllable by the following factors taken separately or in combination: position of the accelerator pedal, engine speed, speed of one of the shafts of the gear-box, depression at the admission, over-pressure at the exhaust, inclination or load of the vehicle, time, various ratios of the gear-box, the position of the third brush 43 being variable as a function of these factors.

Reference will now be made to FIG. 4, in which the arrangement combines the third brush 43 of FIG. 1 or FIG. 2 with a stabilising non-inductive resistance 48.

In the example shown in FIG. 4, a manual reversing switch 61 has a moving finger 62 which is connected to one terminal 63 of a double reversing relay 65. The finger 62 may be put into contact at will either with a conductor 66 for purposes of overhaul or repair, or for normal operation, with a conductor 67. The conductor 66 connects the battery B with a terminal 64 of the reversing switch 65, the terminals 63 and 64 forming one pair of terminals. The conductor 67 connects the brush 43 to a further terminal 68 of the reversing switch 65.

The reversing switch 65 has two moving fingers, one of which 69 co-operates with the terminal 63 or 64, while the other 70 co-operates with the terminal 68, and both being actuated by a solenoid 71. The circuit of the latter is supplied by the battery B through the intermediary of the ignition coil 30, and comprises a switch 72 which is controlled, in the example shown, by the speed of the outgoing shaft of the gear-box. When this speed is less than a pre-determined value, the finger 69 is on the terminal 63 and the finger 70 on the terminal 68. When this speed is greater than this value, the finger 69 is on the terminal 64 and the finger 70 is insulated from the terminal 68. The switch 72 could also be controlled by the speed of the intake shaft of the gear-box, or again of the intermediate shaft.

The finger 70 is connected to a conductor 73 which comprises the stabilising resistance 48 and a switch 49, and which is connected to earth. The switch 49 is controlled by the condition of the gear-box so that it is closed in first gear and reverse, while it is open in neutral, in second gear and higher gears of the gear-box.

Switches which are responsive to selected gear in a gear-box transmission are known in the art and are used for instance in a device disclosed in our United States Patent No. 2,880,831 although this was in other purpose than in the present invention.

The resistance circuit 73 results in an additional consumption of current, but it should be observed that this consumption is limited by means of the relay 49 to certain phases of operation in which it does not change the normal conditions of charge of the battery. The circuit 73 gives the remarkable result of stabilising the curve which connects the variations of the dynamo voltage with the engine speed, and in consequence it makes the increase in voltage at the clutch coil 10 more faithful and more gradual. The brushes 41 and 42 of the dynamo have in fact, like all other brushes, an application pressure which is variable and which introduces uncontrollable variations in brush contact-resistance. These variations assume a large relative importance when the armature current is small. They then introduce substantial variations in the shunt excitation current which results in large variations in the voltage-speed curve of the armature. The resistance circuit 73 has the effect of increasing the armature current at low speeds and thus reduces the relative magnitude of the variations in resistance of the brushes, thereby stabilising the shunt excitation current and preventing the untimely variations of the armature voltage. In addition to this stabilising function, the resistance circuit 73 provides a higher degree of progression at low speeds by spreading out the increase in voltage of the dynamo as a function of the speed.

The characteristics of the stabilising circuit are such that, with the lower gear ratios and for a sufficiently low speed of the output shaft of the gear-box, the generator does not develop a voltage greater than 1.3 times the voltage of the battery; the stabilising circuit may be connected to the main brush or to the third brush or again to a fourth brush placed on the semi-circumference opposite to that on which the third brush is located; the stabilising circuit can be eliminated as a function of one or a number of factors such as the ratio of the gear-box, the engine speed, the speed of one of the shafts of the gear-box, the voltage or the current of the clutch circuit or of the stabilising circuit, these factors coming into action either if one of them has a pre-determined characteristic or if a number of factors exhibit a predetermined characteristic simultaneously.

The finger 69 is connected to a terminal 74 of a reversing relay 76, the other terminal 75 of which is connected to the main brush 41 through the intermediary of a resistance 77 which is intended to facilitate de-clutching. The solenoid 78 which actuates the moving finger 79 of the relay 76 has its circuit supplied by the battery B through the intermediary of the ignition coil 30 and comprising a switch 80. The latter is operated by the pressure of oil in the braking device of the vehicle, and can be constituted by the usual stop switch. The filament of the stop light is shown at 81. When there is no braking applied, the filament 81 is extinguished and the finger 79 is on the terminal 74 which enables the clutch to be supplied either through the brush 43 or by the battery B, depending on the position of the switch 72. When the brakes are applied, the filament 81 lights-up and the finger 79 is on the terminal 75, which ensures the supply to the clutch from the brush 41.

The finger 79 is connected to a terminal 82 of a relay 83, the moving finger 84 of which is actuated by a solenoid 85. The circuit of this latter is supplied from the battery B through the intermediary of the ignition coil 30, and comprises a switch 86 which is responsive to the condition of grip of the gear-changing lever. In periods between the operations of gear-changing, the finger 84 is on the terminal 82, and during these operations it is isolated from this terminal.

The finger 84 is connected to the clutch coil 10 by a conductor 87 which comprises a wear-adjustment resistance 27 together with a further resistance 88 known as the engine-brake resistance. The resistance 88 is shunted by a switch 89 operated by the depression which exists in the gas-suction pipe. When this depression is greater than a pre-determined value, for example of the order of 650 grams, the switch 89 is opened and the resistance 88 is inserted. When the depression is less than this value, the switch 89 is closed and cuts-out the resistance 88. It is to be noted that the resistance 88 may be inserted even when the user, releasing the accelerator pedal, does not release it as far as the position of rest.

For driving, the finger 62 of the manual reversing switch 61 is put in contact with the conductor 67. When starting-up in first gear, the switch 72 is open, the solenoid 71 is not energised, the finger 70 is on the terminal 68 and the finger 69 is on the terminal 63, the switch 49 is closed, the resistance 48 is inserted, the switch 80 is open, the finger 79 is on the terminal 74, the switch 86 is open, the finger 84 is on the terminal 83, and the switch 89 is closed. The resistance 88 is cut-out when the accelerator is operated to an appreciable extent. The clutch 10 is supplied from the third brush 43 of the dynamo with the intervention in shunt of the stabilising resistance 48, which increases the progression.

When the second gear or higher gear is engaged, the switch 49 opens and the resistance 48 is cut-out, but the supply remains ensured by the third brush if the speed of the vehicle is sufficiently low.

Whatever ratio of the gear-box may be actually in use, the speed of the vehicle will be rapidly reached at which the fingers 70 and 69 reverse and which, in accordance with the invention, is chosen to be a low speed, for example of the order of 15 km. per hour. The resistance 48 will then be without effect, even in first gear and reverse. Whatever gear ratio may be engaged, the supply will be ensured by the battery above 15 km. per hour.

The very low value of the speed of the vehicle which initiates the supply from the battery prevents even in first gear or reverse, the voltage developed by the brush 43 does not reach a value which is dangerous for the operation of the contacts of the clutch circuit. In addition, it has the advantage of permitting the braking effect of the engine to be retained down to a low speed of the vehicle.

The relay 76 is provided in order that, in third gear or a higher combination of the gear-box, the supply from the battery is not continued up to speeds of the intake shaft of the gear-box which are less than the idling speed of the engine, and so that in case of braking to a standstill with these gear-box ratios, there is no risk of stalling the engine.

With the intervention of the relay 76, as soon as the user brakes, the switch 80 closes and the finger 79 is applied to the terminal 75, which substitutes a supply from the main brush 41, under the resistance 77, for the battery supply. By this means, stalling is prevented, since the generator 44 at the idling speed delivers a voltage at its main brush 41 which is insufficient to engage the clutch.

In the case where the user might change down under incorrect conditions such that skidding of the driving wheels might be feared, it should be noted that the release of the accelerator opens the switch 89 and inserts the resistance 88, which plays the part of a torque limiter when changing down, supplying the clutch at a reduced voltage and thus avoiding such skidding of the driving wheels.

For the purposes of parking or examination and repair, the finger 62 of the hand reversing switch 61 is placed in contact with the conductor 66, which provides supply from the battery.

What we claim is:

1. In an electric control circuit for an electromagnetic clutch of an automobile vehicle having an engine, driving wheels, a dynamo having two main brushes and driven by said engine, a transmission having at least two shafts, said transmission being driven by said engine through said clutch and driving said wheels, a storage battery, a cut-out switch coupling said battery to said main brushes of said dynamo, a control coil for said clutch, an auxiliary brush disposed on said dynamo between said main brushes, connecting means for supplying power from said dynamo to said clutch control coil through said auxiliary brush, and a relay inserted in said connecting means for selectively connecting said clutch control coil to said battery, the combination with said relay of an exciting circuit for said relay, means for connecting one end of said exciting circuit to said battery, means for grounding the other end of said exciting circuit, a switch in said exciting circuit, means responsive to the speed of one of said transmission shafts, and means operatively connecting said responsive means and said switch for making the relay connecting the clutch control coil to said battery when the speed of said shaft exceeds a predetermined value.

2. In an electric control circuit for an electromagnetic clutch of an automobile vehicle having an engine, driving wheels, a dynamo having one main feeding brush and one main ground brush and driven by said engine, a transmission driven by said engine through said clutch and driving said wheels, a storage battery, a cut-out switch coupling said battery to said main brushes of said dynamo, a control coil for said clutch, an auxiliary brush disposed on said dynamo between said main brushes, connecting means for supplying power from said dynamo to said clutch control coil through said auxiliary brush, the combination with said connecting means of a relay inserted in said connecting means for selectively connecting said clutch control coil to said main feeding brush.

3. An electric control circuit as defined in claim 2 further comprising an exciting circuit for said relay connected to said auxiliary brush for making the relay connecting the clutch control coil to said main feeding brush when the auxiliary brush voltage exceeds a predetermined value.

4. An electric control circuit as defined in claim 2 further comprising a braking system for said vehicle, means responsive to the actuation of said braking system, an exciting circuit for said relay connected to said battery, a switch in said exciting circuit, and means operatively connecting said responsive means and said switch for making said relay connecting the clutch control coil to said main feeding brush when said braking system is actuated.

5. In an electric control circuit for an electromagnetic clutch of an automobile vehicle having an engine, driving wheels, a braking system, a dynamo having one main feeding brush and one main ground brush and driven by said engine, a transmission having at least two shafts, said transmission being driven by said engine through said clutch and driving said wheels, a storage battery, a cut-out switch coupling said battery to said main brushes of said dynamo, a control coil for said clutch, an auxiliary brush disposed on said dynamo between said main brushes, connecting means for supplying power from said dynamo to said clutch control coil through said auxiliary brush, and a first relay inserted in said connecting means for selectively connecting said control coil to said battery, the combination with said connecting means of a second relay inserted in said connecting means for selectively connecting said clutch control coil to said main feeding brush.

6. An electric control circuit as defined in claim 5 wherein said first relay is responsive to the speed of one of said transmission shafts and said second relay is responsive to the auxiliary brush voltage, said first relay over-riding said second relay.

7. An electric control circuit as defined in claim 5 wherein said first relay is responsive to the speed of one of said transmission shafts and said second relay is responsive to the braking system actuation, said second relay over-riding said first relay.

8. In an electric control circuit for an electromagnetic clutch of an automobile vehicle having an engine, driving wheels, a dynamo having one main feeding brush element and one main ground brush and driven by said engine, a transmission having at least two shafts, said transmission being driven by said engine through said clutch and driving said wheels, a storage battery element, a cut-out switch coupling said battery to said main brushes of said dynamo, a control coil for said clutch, an auxiliary brush disposed on said dynamo between said main brushes, and connecting means for supplying power from said dynamo to said clutch control coil through said auxiliary brush, the combination with said connecting means of at least a relay inserted in said connecting means for selectively connecting said control coil to one of said elements, a stabilizing resistant circuit, switch means for conecting said stabilizing resistant circuit with said auxiliary brush in parallel with said clutch control coil, said switch means being controlled by said relay.

9. An electric control circuit as defined in claim 8 wherein said relay is responsive to the speed of one of said transmission shafts for opening said switch means when said speed exceeds a predetermined value.

10. An electric control circuit for an electromagnetic clutch of an automobile vehicle having an engine, driving wheels, a dynamo having one main feeding brush and one main ground brush and driven by said engine, a transmission driven by said engine through said clutch and driving said wheels, a storage battery, a cut-out switch coupling said battery to said main brushes of said dynamo, a control coil for said clutch, an auxiliary brush disposed on said dynamo between said main brushes, and connecting means for supplying power from said dynamo to said clutch control coil through said auxiliary brush, said auxiliary brush having in the direction of rotation of said dynamo an angular position comprised between $+15°$ and $-45°$, the polar axis of said main brushes being taken as the direction of origin, the angles being counted positively towards the main feeding brush and negatively towards the main ground brush.

11. An electric control circuit as defined in claim 10 wherein said angular position is comprised between $0°$ and $-35°$.

References Cited in the file of this patent

UNITED STATES PATENTS

| | | |
|---|---|---|
| 1,946,200 | Easter | Feb. 6, 1934 |
| 2,788,872 | Winther | Apr. 16, 1957 |
| 2,896,757 | Palys | July 28, 1959 |

FOREIGN PATENTS

| | | |
|---|---|---|
| 1,076,913 | France | Nov. 3, 1954 |
| 185,243 | Austria | Apr. 10, 1956 |